(12) United States Patent
Xie et al.

(10) Patent No.: US 9,581,878 B2
(45) Date of Patent: Feb. 28, 2017

(54) WAVELENGTH SELECTIVE SWITCH DEVICE, WAVELENGTH SWITCHING METHOD FOR THE SAME AND COMMUNICATION APPARATUS

(71) Applicant: Wuhan Research Institute of Posts and Telecommunications, Wuhan, Hubei Province (CN)

(72) Inventors: Dequan Xie, Wuhan (CN); Quan You, Wuhan (CN); Zichen Liu, Wuhan (CN); Ying Qiu, Wuhan (CN); Miaofeng Li, Wuhan (CN); Qi Yang, Wuhan (CN)

(73) Assignee: WUHAN RESEARCH INSTITUTE OF POSTS AND TELECOMMUNICATIONS, Wuhan, Hubei Province (CN)

( * ) Notice: Subject to any disclaimer, the term of this patent is extended or adjusted under 35 U.S.C. 154(b) by 262 days.

(21) Appl. No.: 14/258,642

(22) Filed: Apr. 22, 2014

(65) Prior Publication Data

US 2015/0124187 A1    May 7, 2015

(30) Foreign Application Priority Data

Nov. 5, 2013   (CN) .......................... 2013 1 0539900

(51) Int. Cl.
*G02F 1/31*       (2006.01)
*G02F 1/29*       (2006.01)
(Continued)

(52) U.S. Cl.
CPC .................. *G02F 1/31* (2013.01); *G02F 1/29* (2013.01); *G02F 1/293* (2013.01); *G02F 1/295* (2013.01);
(Continued)

(58) Field of Classification Search
CPC . G02F 1/29; G02F 1/293; G02F 1/295; G02F 1/31; G02F 1/313
See application file for complete search history.

(56) References Cited

U.S. PATENT DOCUMENTS

2014/0363162 A1* 12/2014 Chu ....................... B82Y 20/00
                                                              398/49
2015/0037031 A1   2/2015 You et al.

FOREIGN PATENT DOCUMENTS

CN      102868476 A    1/2013
CN      103353633 A    10/2013
(Continued)

OTHER PUBLICATIONS

China Patent Office, "Office Action for CN 201310539900.9," Apr. 3, 2015.
(Continued)

*Primary Examiner* — Dung Nguyen
(74) *Attorney, Agent, or Firm* — Manabu Kanesaka

(57) ABSTRACT

There are provided a wavelength selective switch device, a communication apparatus and a wavelength switching method. The wavelength selective switch device includes an incidence unit; an exit unit; a wavelength diversifying-synthesizing unit for diversifying and multiplexing the respective incident lights in a first axis direction; a light adjustment unit for making the lights of respective wavelengths be not diversified in the second axis direction; a liquid crystal beam deflection unit having a plurality of pixels divided into sub-regions, for deflecting the lights of the respective wavelengths by changing phase-shift characteristics of the pixels in the sub-regions; a reflection unit, disposed in parallel with the liquid crystal beam deflection unit; a deflection driving unit for driving electrodes of the pixels to generate required phase-shift characteristics.

19 Claims, 6 Drawing Sheets

(51) Int. Cl.
  *G02F 1/295* (2006.01)
  *G02F 1/313* (2006.01)
  *H04Q 11/00* (2006.01)
(52) U.S. Cl.
  CPC ...... *G02F 1/313* (2013.01); *H04Q 2011/0026* (2013.01)

(56) References Cited

FOREIGN PATENT DOCUMENTS

| WO | 2012/125722 A1 | 9/2012 |
| WO | 2013/016758 A1 | 2/2013 |

OTHER PUBLICATIONS

China Patent Office, "Second Office Action for Chinese Patent Application No. 201310539900.9," Dec. 16, 2015.

* cited by examiner

WAVELENGTH SELECTIVE SWITCH DEVICE, WAVELENGTH SWITCHING METHOD FOR THE SAME AND COMMUNICATION APPARATUS

CROSS-REFERENCES TO RELATED APPLICATIONS

This application claims the benefit under 35 U.S.C. §119 (a) of Chinese Patent Application No. 201310539900.9 filed on Nov. 5, 2013, the entire disclosures of which are incorporated herein by references for all purposes.

TECHNICAL FIELD

The present invention relates to a field of communication technique, and in particularly, to a wavelength selective switch device, a communication apparatus including the wavelength selective switch device and a wavelength switching method for the wavelength selective switch device.

BACKGROUND

An Intelligent Optical Network (ION) is capable of mining potentialities in bandwidth of the optical network sufficiently, producing various new services in an optical domain and satisfying diversify and personalized requirements from users, so its development has much attention. The ION is mostly composed of a series of system apparatuses with high flexibility. Wavelength Selective Switches (WSSs) are one of important component modules in the ION, with which adding, dropping and direct-passing of optical signals of various wavelengths may be realized.

The existing wavelength selective switch is generally a 1×N wavelength selective switch comprising an incidence unit having one incidence port, and an exit unit having N exit ports. In the wavelength selective switch having a plurality of ports, which is made with a Micro Electro Mechanical System (MEMS), different wavelengths from different input ports can not be implemented to be output from a same output port, and the bandwidths of the optical signals of the different wavelengths are fixed and not adjustable.

With the development of the ION to a net system with higher dimensions, the existing wavelength selective switch leads to a great increasing in the number of the wavelength selective switches in the ION due to its limit number of the ports, and a management of the network is more complex and also a cost for power consumption increases accordingly. Therefore, it is desired to increase the numbers of the incidence ports and the exit ports in the wavelength selective switch and realize a flexible switching among the respective wavelengths.

SUMMARY

Embodiments of the present disclosure provide a wavelength selective switch device, a communication apparatus comprising the wavelength selective switch device and a wavelength switching method for the wavelength selective switch device, which are capable of selecting optical signals of respective wavelengths from a plurality of incidence ports and outputting the same from any one of a plurality of exit ports, so that the numbers of the incidence ports and the exit ports in the wavelength selective switch are increased and a flexible adjustment of bandwidths in the optical signals of the respective wavelengths are realized.

According to a first aspect of the present disclosure, there is provided a wavelength selective switch device comprising: an incidence unit including N incident lights, each incident light being a wavelength division multiplexed light composed of lights of a plurality of wavelengths, N being a natural number; an exit unit including M emergent lights, each emergent light comprising one or more lights of wavelengths selected from the respective incident lights, M being a natural number; a wavelength diversifying-synthesizing unit for diversifying the respective incident lights in the incidence unit in a first axis direction according to the wavelengths, and multiplexing reflecting lights diversified in the first axis direction according to the wavelengths; a light adjustment unit, disposed correspondingly to the respective incident lights and the respective emergent lights in a second axis direction different from the first axis direction, for making the respective incident lights and the respective reflecting lights, which are diversified in the first axis direction, be not diversified in the second axis direction; a liquid crystal beam deflection unit having a plurality of pixels arranged in a same plane and divided into sub-regions corresponding to the respective wavelengths in the incident lights and the emergent lights, respectively, for deflecting the lights of the respective wavelengths received from the light adjustment unit or the reflecting lights of the respective wavelengths by changing phase-shift characteristics of the pixels in the sub-regions; a reflection unit, disposed in parallel with the liquid crystal beam deflection unit, for reflecting the lights of the respective wavelengths deflected in the corresponding sub-regions for the incident lights to the corresponding sub-regions for the emergent lights so as to be deflected; a deflection driving unit for determining an incident sub-region and an exit sub-region for a switch-wavelength to be switched in the liquid crystal beam deflection unit, determining a first phase-shift characteristic of the incidence sub-region and a second phase-shift characteristic of the exit sub-region, and driving electrodes of the pixels in the incidence sub-region and the exit sub-region to generate the first phase-shift characteristic and the second phase-shift characteristic.

According to a second aspect of the present disclosure, there is provided a communication apparatus comprising the wavelength selective switch device described above.

According to a third aspect of the present disclosure, there is provided a wavelength switching method for a wavelength selective switch device comprising an incidence unit including N incident lights, each incident light being a wavelength division multiplexed light composed of lights of a plurality of wavelengths, N being a natural number; an exit unit including M emergent lights, each emergent light comprising one or more lights of wavelengths selected from the respective incident lights, M being a natural number; a wavelength diversifying-synthesizing unit for diversifying the respective incident lights in the incidence unit in a first axis direction according to the wavelengths, and multiplexing reflecting lights diversified in the first axis direction according to the wavelengths; a light adjustment unit, disposed correspondingly to the respective incident lights and the respective emergent lights in a second axis direction different from the first axis direction, for making the respective incident lights and the respective reflecting lights, which are diversified in the first axis direction, be not diversified in the second axis direction; a liquid crystal beam deflection unit having a plurality of pixels arranged in a same plane and divided into regions corresponding to the incident lights and the emergent lights, respectively, in the second axis direction, and each region being divided into a plurality of sub-regions corresponding to the wavelengths in the first axis direction, for deflecting the lights of the respective wavelengths received from the light adjustment unit or the reflecting lights of the respective wavelengths by changing phase-shift characteristics of the pixels in the sub-regions; a reflection unit, disposed in parallel with the liquid crystal beam deflection unit, for reflecting the lights of the respective wavelengths deflected in the corresponding sub-regions for the incident lights to the corresponding sub-regions for the emergent lights so as to be deflected, the wavelength switching method comprises: determining an incident sub-region and an exit sub-region for a switch-wavelength in the liquid crystal beam deflection unit; determining a first phase-shift characteristic of the incidence sub-region and a second phase-shift characteristic of the exit sub-region; and driving electrodes of the pixels in the incidence sub-region and the exit sub-region to generate the first phase-shift characteristic and the second phase-shift characteristic.

In the above wavelength selective switch device, the communication apparatus comprising the wavelength selective switch device and the wavelength switching method for the wavelength selective switch device according to the embodiments of the present disclosure, the optical signals of the respective wavelengths from any one of the plurality of incident ports may be output from any one of the plurality of the exit ports by cooperating the liquid crystal beam deflection unit and the reflection unit and deflecting the lights in the sub-regions for the incident lights and the emergent lights, so that the number of the ports in the wavelength selective switch device is increased greatly and the bandwidths of the optical signals of the respective wavelengths may be adjusted flexibly.

BRIEF DESCRIPTION OF THE DRAWINGS

In order to explain solutions in embodiments of the present disclosure or the prior art more clearly, drawings required as describing the embodiments of the present disclosure or the prior art will be introduced briefly below. Obviously, the drawings described below only some embodiments of the present disclosure, but those ordinary skilled in the art may obtain other drawings according to these drawings without any inventive labors.

DETAILED DESCRIPTION

Solutions in embodiments of the present disclosure will be described clearly and fully below in connection with drawings in the embodiments of the present disclosure, and obviously the described embodiments are only part of the embodiments of the present disclosure, instead of all of the embodiments of the present disclosure.

In the present disclosure, it will be understood that when a specified section is referred to as being "between" a first section and a second section, intervening sections may be or not be present between the specified section and the first section or the second section; when a specified section is referred to as being "connected to" or "coupled to" another section, it can directly be connected to or coupled to the other element without any intervening sections or intervening elements may be present there between.

Figure 1:
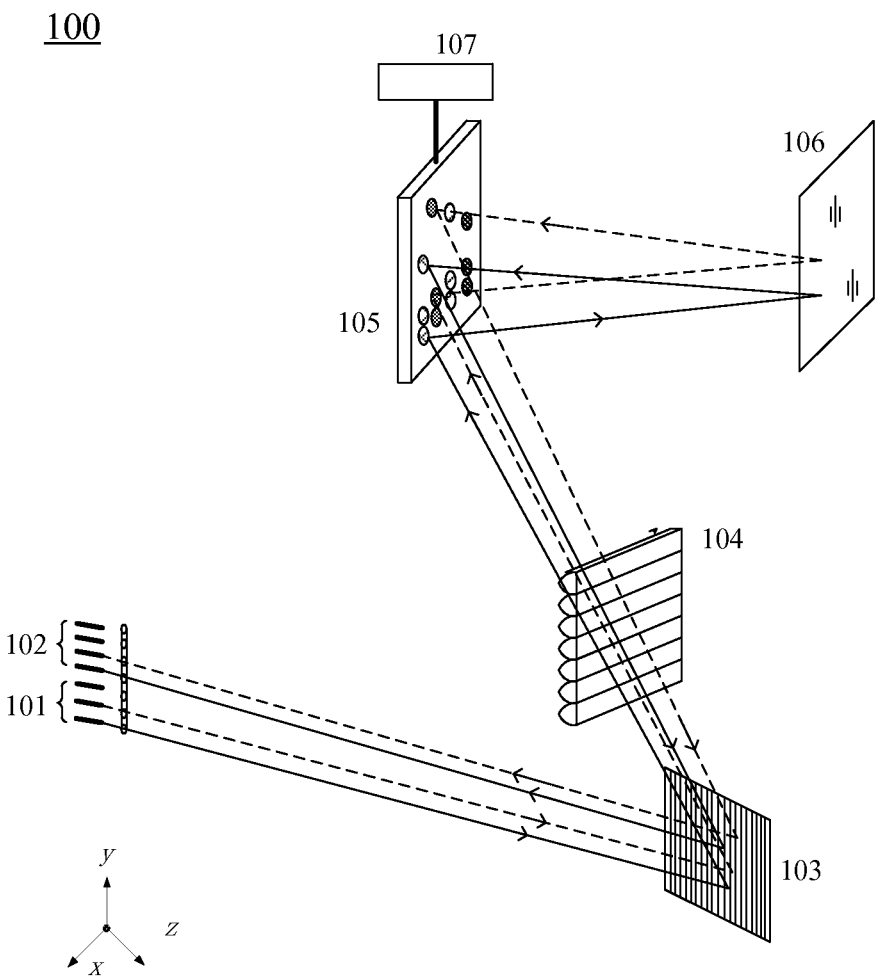
FIG. 1 is a block diagram exemplarily illustrating a wavelength selective switch device according to a first embodiment of the present disclosure.

FIG. 1 is a block diagram exemplarily illustrating a wavelength selective switch device 100 according to a first embodiment of the present disclosure. The wavelength selective switch device 100 may select optical signals of respective wavelengths of a plurality of incidence ports and output the same from any one of a plurality of exit ports, which greatly increases numbers of the incidence ports and the exit ports in the wavelength selective switch.

The wavelength selective switch device 100 in FIG. 1 comprises: an incidence unit 101 including N incident lights, each incident light is a wavelength division multiplexed light composed of lights of a plurality of wavelengths, N is a natural number; an exit unit 102 including M emergent lights, each emergent light comprises one or more lights of wavelengths selected from the respective incident lights, M is a natural number; a wavelength diversifying-synthesizing unit 103 for diversifying the respective incident lights in the incidence unit in a first axis direction according to the wavelengths, and multiplexing reflecting lights diversified in the first axis direction according to the wavelengths; a light adjustment unit 104, disposed correspondingly to the respective incident lights and the respective emergent lights in a second axis direction different from the first axis direction, for making the respective incident lights and the respective reflecting lights, which are diversified in the first axis direction, be not diversified in the second axis direction; a liquid crystal beam deflection unit 105 having a plurality of pixels arranged in a same plane and divided into sub-regions corresponding to the respective wavelengths in the incident lights and the emergent lights, respectively, for deflecting the lights of the respective wavelengths received from the light adjustment unit or the reflecting lights of the respective wavelengths by changing phase-shift characteristics of the pixels in the sub-regions; a reflection unit 106, disposed in parallel with the liquid crystal beam deflection unit 105, for reflecting the lights of the respective wavelengths deflected in the corresponding sub-regions for the incident lights to the corresponding sub-regions for the emergent lights so as to be deflected; a deflection driving unit 107 for determining an incident sub-region and an exit sub-region for a switch-wavelength to be switched in the liquid crystal beam deflection unit 105, determining a first phase-shift characteristic of the incidence sub-region and a second phase-shift characteristic of the exit sub-region, and driving electrodes of the pixels in the incidence sub-region and the exit sub-region to generate the first phase-shift characteristic and the second phase-shift characteristic.

As illustrated in FIG. 1, the incidence unit 101 comprises three (3) incident lights (that is, N=3), each of the incident lights may be a wavelength division multiplexed light composed of lights of a plurality of wavelengths (for example, $\lambda_1, \lambda_2, \lambda_3, \ldots$, etc.), or also may be the light of a single wavelength. A number of the incident lights may be set properly depending on requirements, and also may be, for example, 8, 16, 32, etc. A number of wavelengths which are wavelength division multiplexed in each incident light may be set properly depending on requirements, and the number of the wavelengths which are wavelength division multiplexed in the respective incident lights may be different. Generally, one incident light is provided by one fiber, but the respective incident lights also may be provided from other network apparatuses according to various positions at which the wavelength selective switch device locates in the network. Each of the incident lights has a corresponding incidence port. In other words, there are N incidence ports corresponding to the N incident lights, respectively. Thereafter, a description is made by an incident light comprising wavelengths $\lambda_1, \lambda_2, \lambda_3$ as an example. The incidence unit 101 may comprise a collimator array for inputting the N incident lights in a collimation manner.

As illustrated in FIG. 1, the exit unit 102 comprises four (4) emergent lights (that is, M=4), each of the emergent lights may be a light of a single wavelength, or also may be a wavelength division multiplexed light composed of lights of a plurality of wavelengths. The lights of the respective wavelengths in each emergent light are lights of the respective wavelengths selected from the respective incident lights. Numbers of the wavelengths included in the respective emergent lights may be different. Generally, one emergent light is output to one fiber, but also may be transmitted to other devices in a network. Each of the emergent lights has a corresponding exit port, so that there are M exit ports corresponding to the M emergent lights, respectively. The exit unit 102 may also comprise a collimator array for exiting the M emergent lights in a collimation manner. As described later, a transmission direction of any one of the wavelengths in any one of the incident lights may be changed and selected by the liquid crystal beam deflection unit 105 and the reflection unit 106, and any one of the wavelengths may be output from any one of the exit ports, so that adding, dropping, direct-passing and the like of optical signals of various wavelengths may be realized.

For the respective incident lights from the incidence unit 101, the wavelength diversifying-synthesizing unit 103 diversifies the respective incident lights in the first axis direction according to the wavelengths, that is, diversifies the respective wavelengths of each incident light in the first axis direction spatially, in order to control the light of each wavelength separately. It is assumed that the transmission direction of the light is Z axis and X axis and Y axis, which are perpendicular to each other, define a plane being perpendicular to the Z axis, the first axis direction may be any one of the X axis and the Y axis, and also may be a direction defined with other manners in other coordinate systems. Thereafter, the present disclosure will be described by making a case wherein the first axis direction is the X axis as an example. In particularly, the wavelength diversifying-synthesizing unit 103 may diversify the incident light IN1 including the wavelengths $\lambda_1, \lambda_2, \lambda_n$ into three lights of the wavelengths $\lambda_1, \lambda_2, \lambda_n$, respectively, in the first axis direction (for example, the X axis direction).

For the reflecting lights of the respective wavelengths to be output to the exit unit 102, the wavelength diversifying-synthesizing unit 103 may multiplex the reflecting lights diversified in the first axis direction according to the wavelengths, that is, multiplex the lights of the plurality of wavelengths in the first axis direction into one emergent light, and provide the same to a corresponding exit port in the exit unit. The wavelength diversifying-synthesizing unit 103 performs operations on the reflecting lights of the respective wavelengths, which are inverse of those on the respective incident lights.

As illustrated in FIG. 1, the wavelength diversifying-synthesizing unit 103 may be a diffraction grating of transmittance type, but is not limited thereto and also may be a diffraction grating of reflection type or a wavelength division multiplexed-demultiplexed device. The wavelength diversifying-synthesizing unit 103 may be embodied with any other apparatus capable of realizing the multiplexing and demultiplexing (or diversifying) of the lights of the different wavelengths in the first axis direction, and its detailed implementation does not limit the scope of the present disclosure.

The light adjustment unit 104 is used for making the respective incident lights and the respective reflecting light, which are diversified in the first axis direction, be not diversified in the second axis direction. The plurality of the wavelengths in each of the incident lights are diversified in the first axis direction through the wavelength diversifying-synthesizing unit 103, because the incidence unit 101 has the plurality of the incident lights. The respective incident lights are distinguished spatially in order that the respective wavelengths in the different incident lights do not affect each other, so that the different incident lights may occupy different positions in the second axis direction. Similarly, the light adjusting unit 104 also allows the respective emergent lights to be transmitted to the exit unit 102 to occupy different position in the second axis direction and not to be diversified in the second axis direction. The second axis direction may be the Y axis being perpendicular to the X axis, or any other axis direction distinguishable from the first axis direction spatially. Thereafter, the present disclosure may be described by making a case wherein the second axis direction is the Y axis as an example.

The light adjustment unit 104 is disposed correspondingly to the respective incident lights and the respective emergent lights in the second axis direction, in order to distinguish the respective incident lights and the respective emergent lights. As illustrated in FIG. 1, the respective incident lights from the incidence unit 101 and the respective emergent lights from the exit unit 102 are arranged in the Y axis direction, and accordingly, the light adjustment unit 104 may control the respective incident lights and the respective emergent lights to be not diversified in the Y axis direction, that is, limit them to different positions on the Y axis, respectively, so that the different wavelengths in the N incident lights and the M emergent lights do not affect each other.

As an example, the light adjustment unit 104 may be a cylindrical lens array shown in FIG. 1, which comprises a plurality of cylindrical lenses arranged in the Y axis direction, and the respective cylindrical lenses arranged in the Y axis direction correspond to the respective incident lights and the respective emergent lights in the Y axis direction. Positions of the respective cylindrical lenses in the light adjustment unit 104 may changed correspondingly when the positions of the respective incident lights and the respective emergent lights change. Further, the respective incident lights and the respective emergent lights may be controlled in the second axis direction by means of other devices depending on other factors such as a wavelength distribution of the incident lights or the emergent lights. Detailed implementation of the light adjustment unit 104 does not limit the scope of the present disclosure.

It should note that positions of the wavelength diversifying-synthesizing unit 103 and the light adjustment unit 104 may be interchanged. That is to say, as required, the incident light may be transmitted to the light adjustment unit 104 firstly and next to the wavelength diversifying-synthesizing unit 103, and then to the liquid crystal beam deflection unit 105.

The liquid crystal beam deflection unit 105 has a plurality of pixels arranged in a same plane, the plurality of pixels being divided into sub-regions corresponding to the respective wavelengths in the incident lights and the emergent lights, respectively. The liquid crystal beam deflection unit 105 deflects the lights of the respective wavelengths received from the light adjustment unit or the reflecting lights of the respective wavelengths by changing phase-shift characteristics of the pixels in the sub-regions. The liquid crystal beam deflection unit 105 may be manufactured based on a Liquid Crystal On Silicon (LCOS) or a Blue Phase Liquid Crystal (BPLC), wherein a phase of each pixel is adjustable, so that the lights input to the pixels in the respective sub-regions are deflected by configuring the phase-shift characteristics of the respective pixels, thus the transmission directions of the lights of the respective wavelengths may be changed. The liquid crystal beam deflection unit 105 may be equivalent to a diffraction grating having a controllable deflection angle.

Figure 2:
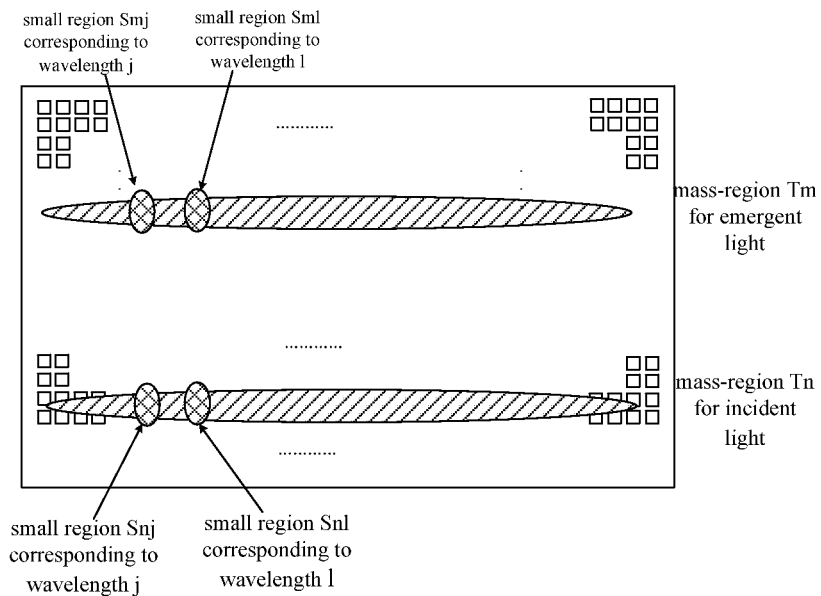
FIG. 2 exemplarily illustrates a layout of sub-regions for deflecting lights in a liquid crystal beam deflection unit in the wavelength selective switch device according to the first embodiment of the present disclosure.

The respective sub-regions in the liquid crystal beam deflection unit 105 may be divided as follows: the plurality of the pixels in the liquid crystal beam deflection unit 105 are divided into mass-regions corresponding to the respective incident lights and the respective emergent lights one to one, respectively, in the second axis direction, and each of the mass-regions is divided into the respective sub-regions corresponding to the wavelengths in the first axis direction. FIG. 2 exemplarily illustrates a layout of sub-regions for deflecting lights in the liquid crystal beam deflection unit 105 in the wavelength selective switch device 100. As illustrated in FIG. 2, the plurality of the pixels are divided into the mass-regions corresponding to the respective incident lights and the respective emergent lights one to one, respectively, in the second axis direction (Y axis), wherein the mass-region Tn is the mass-region for the incident light INn (1≤n≤N), and the mass-region Tm is the mass-region for the emergent light Om (1≤m≤M). In the mass-region Tn, a plurality of sub-regions are set according to a number of the wavelengths in the incident light INn, for example, a sub-region Snj corresponding to a wavelength λj, a sub-region Sn1 corresponding to a wavelength λ1, and the like, as illustrated in FIG. 2; in the mass-region Tm, a plurality of sub-regions are set according to a number of the wavelengths in the emergent light Om, for example, a sub-region Smj corresponding to the wavelength λj, a sub-region Sm1 corresponding to the wavelength λ1, and the like, as illustrated in FIG. 2. The division of the sub-regions in FIG. 2 is only exemplary, and there may be other division manner according to positions of the incidence ports and the exit ports or the different wavelengths of the respective ports.

A reflection unit 106 is disposed in parallel with the liquid crystal beam deflection unit 105, and is used for reflecting the lights of the respective wavelengths deflected in the corresponding sub-regions for the incident lights to the corresponding sub-regions for the emergent lights so as to be deflected. The respective incident lights are reflected after being transmitted to the reflection unit 106 so as to become the reflecting lights to be transmitted to the exit unit 102. The reflection unit 106 may be, for example, a flat mirror, a reflecting prism, etc, and any component capable of realizing optical reflection may act as the reflection unit. A deflection in the liquid crystal beam deflection unit 105 and a reflection in the reflection unit 106 of a light of a specified wavelength in the incident lights will be described below in connection with FIG. 3.

Figure 3:
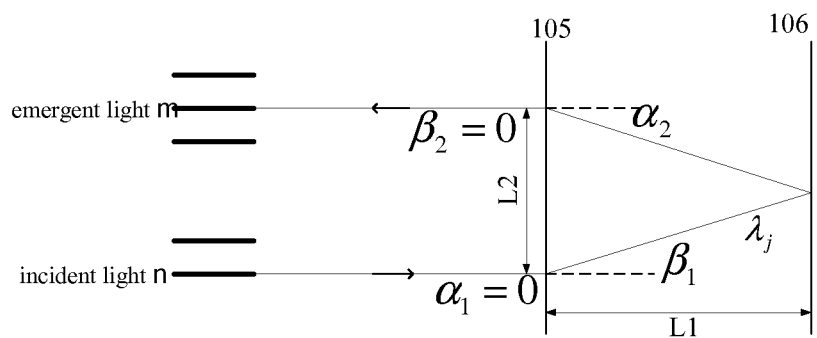
FIG. 3 exemplarily illustrates a wavelength switching in the wavelength selective switch device according to the first embodiment of the present disclosure.

FIG. 3 exemplarily illustrates a wavelength switching in the wavelength selective switch device 100 according to the first embodiment of the present disclosure. FIG. 3 illustrates a view wherein the liquid crystal beam deflection unit 105 and the reflection unit 106 is in the second axis direction (Y axis). By making a wavelength λj output from the light adjustment unit 104 as an example, it is assumed that the wavelength λj is input to the sub-region Snj in the liquid crystal beam deflection unit 105 perpendicularly to the second axis direction ($\alpha_1=0$) and is deflected in the sub-region Snj by an angle $\beta_1$ to enter into the reflection unit 106 so as to be reflected, and the reflecting light by the reflection is transmitted to the sub-region Smj for the emergent light Om in the liquid crystal beam deflection unit 105 by an incident angle $\alpha_2$, the wavelength λj reflected in the sub-region Smj is deflected, output perpendicularly to the second axis direction ($\beta_2=0$) and transmitted to the exit unit 102. In FIG. 3, $\alpha_1=0$ for a purpose of clarity, but the incident angle $\alpha_1$ is generally smaller than ±6° in current art, and is preferably controlled to be smaller than ±4°. The deflection angle $\beta_1$ is controlled by controlling the phase characteristic of pixels in the sub-regions, smaller the deflection angle $\beta_1$ is, higher a deflection efficiency for lights is, a distance between the mass-region Tn at which the sub-region Snj locates and the mass-region Tm at which the sub-region Smj for the emergent light locates in the liquid crystal beam deflection unit may decrease; greater the deflection angle $\beta_1$ is, lower the deflection efficiency for lights is, and the distance L2 between the mass-region Tn and the mass-region Tm may increase. Therefore the distances between the respective mass-regions in the liquid crystal beam deflection unit may be designed based on the deflection efficiency for lights of the liquid crystal beam deflection unit.

The deflection driving unit 107 is used for driving the liquid crystal beam deflection unit 105 to realize the light reflection in the respective sub-regions. For a switch-wavelength λj to be switched, the deflection driving unit 107 determines an incident sub-region and an exit sub-region for the switch-wavelength λj in the liquid crystal beam deflection unit, determines a first phase-shift characteristic of the incidence sub-region and a second phase-shift characteristic of the exit sub-region, and drives electrodes of the pixels in the incidence sub-region and the exit sub-region to generate the first phase-shift characteristic and the second phase-shift characteristic.

Figure 4:
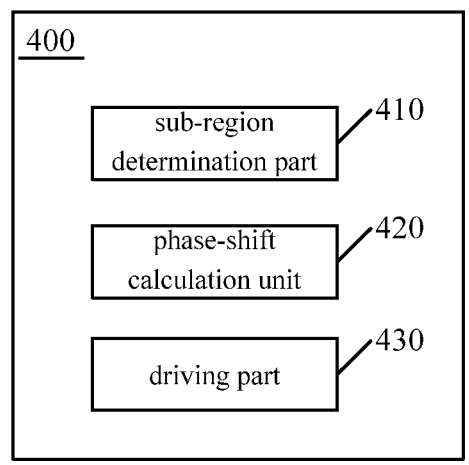
FIG. 4 exemplarily illustrates a structure of a deflection driving unit in the wavelength selective switch device according to the first embodiment of the present disclosure.

FIG. 4 exemplarily illustrates a structure of a deflection driving unit 107 in the wavelength selective switch device 100 according to the first embodiment of the present disclosure. As illustrated in FIG. 4, the deflection driving unit 107 may comprise: a sub-region determination part 410 for determining the incident sub-region and the exit sub-region for the switch-wavelength λj to be switched in the liquid crystal beam deflection unit based on the incident light at which the switch-wavelength locates and the emergent light to which the switch-wavelength is switched; a phase-shift calculation unit 420 for determining a deflection angle $\beta_1$ of the incident sub-region and an incident angle $\alpha_2$ of the exit sub-region based on a position relationship between the incident sub-region and the exit sub-region, and a position relationship between the liquid crystal beam deflection unit and the reflection unit, for determining the first phase-shift characteristic $M_1$ of the incident sub-region and the second phase-shift characteristic $M_2$ of the exit sub-region based on the deflection angle $\beta_1$ and the incident angle $\alpha_2$; and a driving part 430 for applying a first voltage to the pixels in the incident sub-region according to the first phase-shift characteristic $M_1$ and applying a second voltage to the pixels in the exit sub-region according to the second phase-shift characteristic $M_2$, in order to drive the switch-wavelength to be deflected.

By making a switch-wavelength $\lambda j$ as an example, the sub-region determination part 410 may determine the incident light INn at which the switch-wavelength $\lambda j$ locates and the emergent light Om to be switched by receiving a switch instruction, and determine the incident sub-region Snj and the exit sub-region Smj for the switch-wavelength in the liquid crystal beam deflection unit 105 based on the incident light INn at which the switch-wavelength $\lambda j$ locates and the emergent light Om to be switched.

The phase-shift calculation unit 420 may determine the deflection angle $\beta_1$ of the incident sub-region according an equation 1 as follows.

$$\beta_1 = \arctan\frac{L_2}{2L_1} \qquad \text{Equation 1}$$

Wherein $L_1$ is a distance between the liquid crystal beam deflection unit 105 and the reflection unit 106, and $L_2$ is a distance between the incident sub-region and the exit sub-region in the second axis direction, as illustrated in FIG. 3. In a case where the liquid crystal beam deflection unit divides the sub-regions as illustrated in FIG. 2, $L_2$ is equal to a distance between the mass-region Tn at which the incident sub-region Snj locates and the mass-region Tm at which the exit sub-region Smj locates. The incident angle $\alpha_2$ of the switch-wavelength $2j$ in the exit sub-region Smj is equal to the deflection angle $\beta_1$, because the liquid crystal beam deflection unit 105 is parallel to the reflection unit 106. As described above, smaller the deflection angle $\beta_1$ is, higher the corresponding deflection efficiency for lights is. Therefore the distances (for example, L2 in FIG. 2) among the respective mass-regions in the liquid crystal beam deflection unit and the distance (for example, L1 in FIG. 2) between the liquid crystal beam deflection unit and the reflection unit may be designed depending on the deflection efficiency for lights of the liquid crystal beam deflection unit.

The phase-shift calculation unit may determine the first phase-shift characteristic M, and the second phase-shift characteristic $M_2$ according to Equations 2-3 as follows.

$$n\lambda = M_1 d(\sin\alpha_1 + \sin\beta_1) \qquad \text{Equation 2}$$

$$n\lambda = M_2 d(\sin\alpha_2 + \sin\beta_2) \qquad \text{Equation 3}$$

Wherein n is a diffraction order in a case that the liquid crystal beam deflection unit 105 is equivalent to a diffraction grating and generally is 1; $\alpha_1$ is an incident angle of the switch-wavelength in the incident sub-region (for example, Snj), $\beta_1$ is a deflection angle of the switch-wavelength in the incident sub-region, $\beta_2$ is a deflection angle of the switch-wavelength in the exit sub-region (for example, Smj), d is a size of the pixel in the liquid crystal beam deflection unit, and $\lambda$ is the switch-wavelength (for example, $\lambda j$). Therefore, the incident angle $\alpha_1$ and the deflection angle $\lambda_1$ in the incident sub-region may be determined according to an optical path of the wavelength selective switch device, the first phase-shift characteristic $M_1$ in the incident sub-region may be determined by the Equation 2; and similarly the second phase-shift characteristic $M_2$ in the exit sub-region is determined by the Equation 3; so that an optical path control for the switch-wavelength $\lambda$ may be realized.

Figure 5:
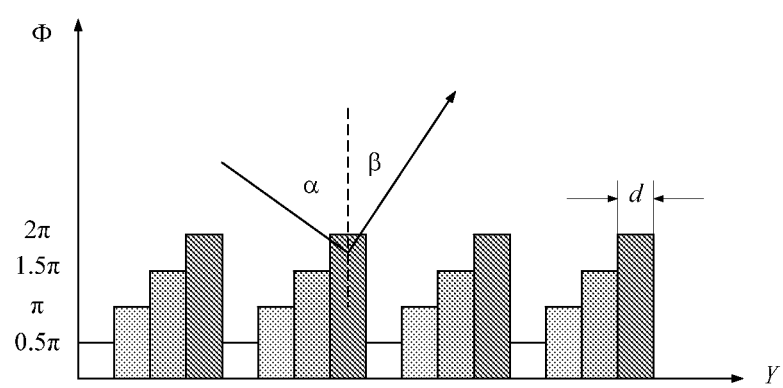
FIG. 5 exemplarily illustrates phase-shift characteristics of the liquid crystal beam deflection unit in the wavelength selective switch device according to the first embodiment of the present disclosure.

As an example, the phase-shift characteristic may be a phase order of the pixel in the liquid crystal beam deflection unit 105. FIG. 5 exemplarily illustrates the phase-shift characteristics of the liquid crystal beam deflection unit 105 in the wavelength selective switch device 100 according to the first embodiment of the present disclosure. In the FIG. 5, the horizontal axis denotes the Y axis being the second axis direction, and the vertical axis denotes a phase $\Phi$ of the pixel, wherein $\Phi=0.5\pi$, $\pi$, $1.5\pi$, $2\pi$. FIG. 5 illustrates a plurality of pixels in each sub-region in the second axis direction, and the phases of the plurality of pixels is $0.5\pi$, $\pi$, $1.5\pi$, $2\pi$, $0.5\pi$, $\pi$, $1.5\pi$, $2\pi$, A phase difference among the plurality of pixels is $\Delta\Phi=0.5\pi$, and a phase order M of each sub-region is $2\pi/\Delta\Phi$ (herein M=4). At this time, the phase difference $\Delta\Phi$ or the phase order M may be used as the phase-shift characteristic. Depending on requirements in precision for controlling, the phase difference $\Delta\Phi$ may also be, for example, $0.05\pi$, $0.1\pi$, $0.2\pi$, $0.4\pi$, $0.6\pi$, and the like, and correspondingly the phase order M may be, for example, 40, 20, 10, 5, 3.33 and the like. As shown in FIG. 5, d denotes a size of the pixel in the liquid crystal beam deflection unit, and a deflection angle $\beta$ may be generated when the incident light enters into a small region by an incident angle $\alpha$. Based on the calculated phase-shift characteristics, the driving part 430 in the deflection driving unit 107 applies voltages to the pixels in the incident sub-regions and the exit sub-regions, in order to drive the switch-wavelength to be deflected.

In the above wavelength selective switch device 100 according to the embodiments of the present disclosure, the optical signals of the respective wavelengths from any one of the plurality of incident ports may be output from any one of the plurality of the exit ports by cooperating the liquid crystal beam deflection unit and the reflection unit and deflecting the lights in the sub-regions for the incident lights and the emergent lights, so that the number of the ports in the wavelength selective switch device is increased greatly and the bandwidths of the optical signals of the respective wavelengths may be adjusted flexibly.

Figure 6:
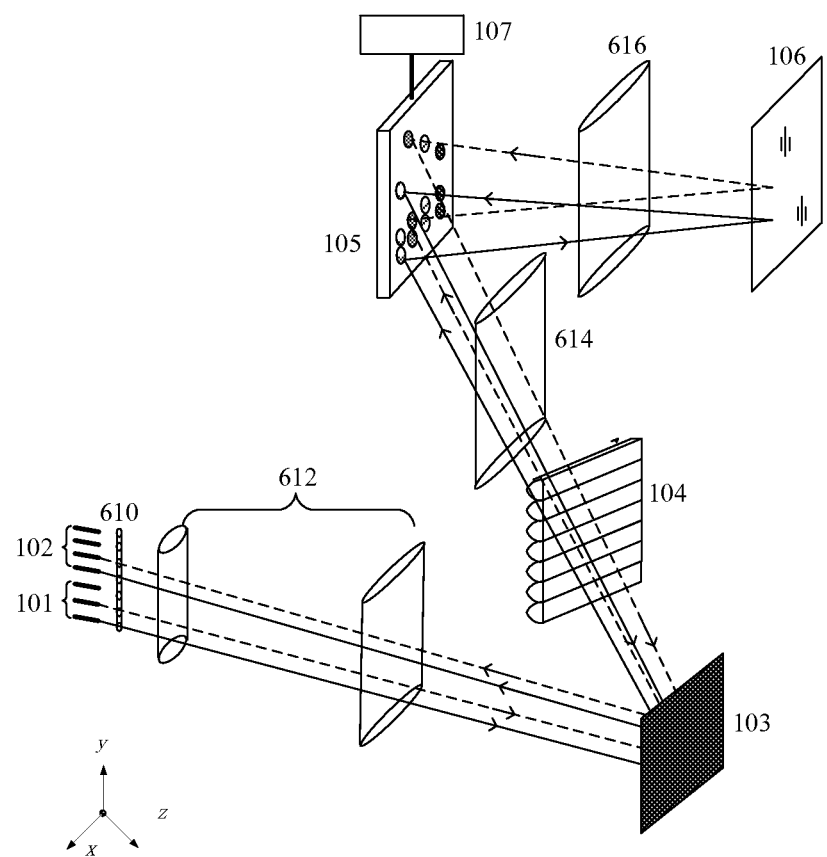
FIG. 6 is a block diagram exemplarily illustrating a wavelength selective switch device according to a second embodiment of the present disclosure.

FIG. 6 is a block diagram exemplarily illustrating a wavelength selective switch device 600 according to a second embodiment of the present disclosure. In FIG. 6, the same reference signs are used to denote the same portions as those in FIG. 1. That is to say, the incidence unit 101, the exit unit 102, the wavelength diversifying-synthesizing unit 103, the light adjustment unit 104, the liquid crystal beam deflection unit 105, the reflection unit 106, the deflection driving unit 107 in FIG. 6 are as same as those in FIG. 1, so their details are omitted herein. FIG. 6 illustrated the wavelength diversifying-synthesizing unit 103 as a diffraction grating of reflection type, instead of the diffraction grating of transmittance type in FIG. 1.

Difference between FIG. 6 and FIG. 1 is in that a polarization conversion unit 610, a beam expanding unit 612, a second light-converging unit 614 and a first light-converging unit 616 are added.

As described above, the liquid crystal beam deflection unit 105 may be the components manufactured based on the Liquid Crystal On Silicon (LCOS) or a Blue Phase Liquid Crystal (BPLC). The LCOS is a polarization dependent component which can only deflect a light of one polarization state. Therefore a polarization conversion apparatus should be added in the wavelength selective switch device when the liquid crystal beam deflection unit 105 is the components manufactured based on the LCOS, in order that the polarization states of the incident lights are uniform. That is to say, the wavelength selective switch device further comprises the polarization conversion unit 610 disposed between the incidence unit 101 and the wavelength diversifying-synthesizing unit 103, which is used for converting the respective incident lights in the incidence unit 101 into the lights of the polarization state deflectable by the liquid crystal beam deflection unit 105, and for converting the respective reflecting lights having a single polarization state from the wavelength diversifying-synthesizing unit 103 into the reflecting lights having two polarization components which are perpendicular to each other.

Figure 7:
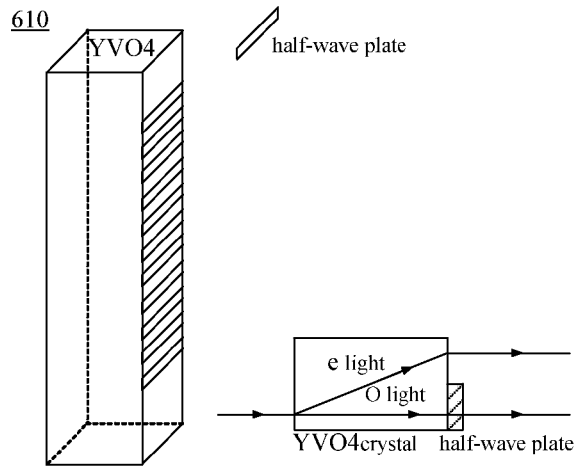
FIG. 7 is an exemplary view illustrating a polarization conversion unit in the wavelength selective switch device according to the second embodiment of the present disclosure.

FIG. 7 is an exemplary view illustrating the polarization conversion unit 610 in the wavelength selective switch device 600. As illustrated in FIG. 7, the polarization conversion unit 610 is composed of a Yttrium Vanadate (YVO4) crystal and a half-wave plate array. The incident light is a random polarized beam, and it is divided into two beams of line polarized lights, o light and e light, and a polarization direction of the o light is rotated by 90° by the half-wave plate, therefore the polarization directions of the two output lights are same. The polarization conversion unit 610 may be implemented with the existing or any other polarization conversion technique developed in future, and it also may be manufactured by an electric-optic polymer, but the detailed implementations do not limit the wavelength selective switch device according to the present disclosure.

When the liquid crystal beam deflection unit 105 is the component manufacture based on the Blue Phase Liquid Crystal (BPLC), the wavelength selective switch device does not need the polarization conversion apparatus, as shown in FIG. 1, because the BPLC is a polarization insensitive apparatus, so that the optical path may be simplified, and an insertion loss, a polarization dependent loss of the wavelength selective switch device may be reduced.

The wavelength selective switch device 600 further comprises the beam expanding unit 612 disposed between the incidence unit and the wavelength diversifying-synthesizing unit, which is used for beam expanding the respective incident lights in the incidence unit 101, in order to increase light spots formed by the respective incident lights in the first axis direction (for example, X axis) as they are input into the wavelength diversifying-synthesizing unit 103. When the light spot on the wavelength diversifying-synthesizing unit 103 formed by the incident light increases, the lights of the respective wavelengths in this incident light may be diversified at a higher efficiency, so that a dispersion ability of the wavelength diversifying-synthesizing unit 103 may be enhanced and the insertion loss of the wavelength selective switch device is reduced.

As illustrated in FIG. 6, the beam expanding unit 612 may comprise a first lens column in the first axis direction and a second lens column in the second axis. The beam expanding unit 612 may be composed of more lenses. It should note that the wavelength selective switch device may not comprise the beam expanding unit 612 if the requirements for performances of the insertion loss, the dispersion ability, etc, of the wavelength selective switch device are low, as illustrated in FIG. 1.

The wavelength selective switch device further comprises a second light-converging unit 614 disposed between the light adjustment unit 104 and the liquid crystal beam deflection unit 105, which is used for converging, in the first axis direction, the lights of the respective wavelengths transmitted between the light adjustment unit 104 and the liquid crystal beam deflection unit 105. The incident light becomes the lights of the respective wavelength, which are diversified, through the light adjustment unit 104, and the lights of the respective wavelengths may be input to the liquid crystal beam deflection unit 105 in a collimation manner or vertically (that is, the incident angle $\alpha_1$ described above is approximatively 0 or equal to 0) by the second light-converging unit 614, although the angles of the lights of the respective wavelengths are diffuse as they enter into the liquid crystal beam deflection unit 105. Further, the lights of the respective wavelengths exited from the liquid crystal beam deflection unit 105 also may be converged to the light adjustment unit 104.

As illustrated in FIG. 3, the driving of the liquid crystal beam deflection unit 105 may be easily realized in a case that both of the incident angle $\alpha_1$ and the deflection angle $\beta_1$ are zero. Therefore the second light-converging unit 614 may be configured to enable the lights of the respective wavelengths in the incident lights to enter into the liquid crystal beam deflection unit perpendicularly to the second axis direction (the incident angle $\alpha_1$ is equal to 0). The respective sub-regions for the emergent lights in the liquid crystal beam deflection unit may be driven such that the emergent lights of the respective wavelengths exit from the liquid crystal beam deflection unit perpendicularly to (the deflection angle $\beta_2$ is equal to zero) the second axis direction. Of course the incident angle $\alpha_1$ and the deflection angle $\beta_2$ may also be not zero, and as described above, the incident angle $\alpha_1$ may be preferably smaller than ±4° and the deflection angle $\beta_2$ also may be set otherwise according to requirements in the optical path.

The wavelength selective switch device 600 further comprises the first light-converging unit 616 disposed between the liquid crystal beam deflection unit 105 and the reflection unit 106, which is used for converging, in the first axis direction, the lights of the respective wavelengths transmitted between the liquid crystal beam deflection unit and the reflection unit. The incident lights of the respective wavelengths are deflected in the respective sub-regions for the incident lights in the liquid crystal beam deflection unit 105, and the angles of the lights deflected are diffused, but the lights deflected in the respective sub-regions for the incident lights may be converged in the first axis direction by the first light-converging unit 616, in order to be transmitted to the respective sub-regions for the emergent lights in a concentrative manner after being reflected by the reflection unit 106, so that the insertion loss of the wavelength selective switch device 600 is reduced. In particular, the first light-converging unit 616 may be configured such that the liquid crystal beam deflection unit 105 is located on its front focal plane while the reflection unit 106 is located on its back focal plane, so that the lights of the respective wavelengths transmitted between the liquid crystal beam deflection unit and the reflection unit are converged.

In a detailed application, on a basis of the wavelength selective switch device shown in FIG. 1, one or more apparatuses of the polarization conversion unit 610, the beam expanding unit 612, the second light-converging unit 614 and the first light-converging unit 616 illustrated in FIG. 6 may be added, instead of adding and using all of them. Furthermore, any other apparatuses may be added as needed, on the basis of the wavelength selective switch device shown in FIG. 1.

In the above wavelength selective switch device 600 according to the embodiments of the present disclosure, the number of the ports in the wavelength selective switch device is increased greatly by cooperating the liquid crystal beam deflection unit and the reflection unit and deflecting the lights in the sub-regions for the incident lights and the emergent lights, and the performance of the wavelength selective switch device is further improved with respect to the insertion loss, the dispersion ability, and the like.

The wavelength selective switch devices according to the different embodiments of the present disclosure are described in connection with FIGS. 1-7. The wavelength selective switch device may be applied to various different communication apparatuses. Accordingly, any communication apparatuses including the wavelength selective switch device according to the embodiments of the present disclosure will fall into the scope of the present disclosure.

Figure 8:
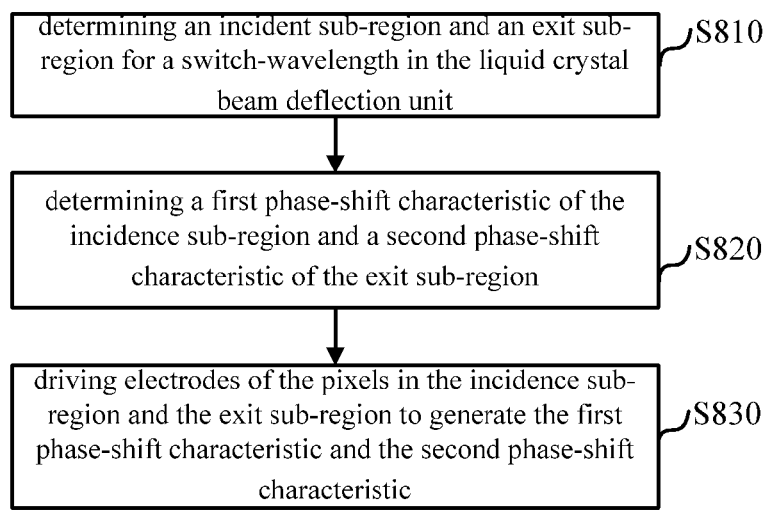
FIG. 8 is a flowchart exemplarily illustrating a wavelength switching method for the wavelength selective switch device according to the embodiments of the present disclosure.

FIG. 8 is a flowchart exemplarily illustrating a wavelength switching method 800 for the wavelength selective switch device according to the embodiments of the present disclosure. The wavelength switching method 800 may be applied to any one of the wavelength selective switch devices illustrated in FIG. 1 and FIG. 6. In particularly, the wavelength switching method 800 may be realized in the deflection driving unit. The wavelength switching method may be embodied with one or more of a Central Processing Unit, a specific chip and a programmable logic array.

The wavelength selective switch device to which the wavelength switching method 800 is applied comprises an incidence unit including N incident lights, each incident light being a wavelength division multiplexed light composed of lights of a plurality of wavelengths, N being a natural number; an exit unit including M emergent lights, each emergent light comprising one or more lights of wavelengths selected from the respective incident lights, M being a natural number; a wavelength diversifying-synthesizing unit for diversifying the respective incident lights in the incidence unit in a first axis direction according to the wavelengths, and multiplexing reflecting lights diversified in the first axis direction according to the wavelengths; a light adjustment unit, disposed correspondingly to the respective incident lights and the respective emergent lights in a second axis direction different from the first axis direction, for making the respective incident lights and the respective reflecting lights, which are diversified in the first axis direction, be not diversified in the second axis direction; a liquid crystal beam deflection unit having a plurality of pixels arranged in a same plane and divided into regions corresponding to the incident lights and the emergent lights, respectively, in the second axis direction, and each region being divided into a plurality of sub-regions corresponding to the wavelengths in the first axis direction, for deflecting the lights of the respective wavelengths received from the light adjustment unit or the reflecting lights of the respective wavelengths by changing phase-shift characteristics of the pixels in the sub-regions; and a reflection unit, disposed in parallel with the liquid crystal beam deflection unit, for reflecting the lights of the respective wavelengths deflected in the corresponding sub-regions for the incident lights to the corresponding sub-regions for the emergent lights so as to be deflected.

The plurality of the pixels in the liquid crystal beam deflection unit may be divided into mass-regions corresponding to the respective incident lights and the respective emergent lights one to one, respectively, in the second axis direction, and each of the mass-regions is divided into the respective sub-regions corresponding to the wavelengths in the first axis direction.

When the liquid crystal beam deflection unit is a component manufactured based on the Liquid Crystal On Silicon (LCOS), the wavelength selective switch device may further comprise a polarization conversion unit disposed between the incidence unit and the wavelength diversifying-synthesizing unit, which is used for converting the respective incident lights in the incidence unit into the lights of the polarization state deflectable by the liquid crystal beam deflection unit, and for converting the respective reflecting lights having a single polarization state from the wavelength diversifying-synthesizing unit into the reflecting lights having two polarization components which are perpendicular to each other.

In order to enhance a dispersion ability of the wavelength diversifying-synthesizing unit, a beam expanding unit 612 may be further added to the wavelength selective switch device, which is disposed between the incidence unit and the wavelength diversifying-synthesizing unit and used for beam expanding the respective incident lights in the incidence unit, in order to increase light spots formed by the respective incident lights in the first axis direction as they enter into the wavelength diversifying-synthesizing unit.

Furthermore, in order to reduce the insertion loss in the wavelength selective switch device, a first light-converging unit, which is disposed between the liquid crystal beam deflection unit and the reflection unit, or a second light-converging unit, which is disposed between the light adjustment unit and the liquid crystal beam deflection unit, may be further added to the wavelength selective switch device. The first light-converging unit is used for converging, in the first axis direction, the lights of the respective wavelengths transmitted between the liquid crystal beam deflection unit and the reflection unit, and the second light-converging unit is used for converging, in the first axis direction, the lights of the respective wavelengths transmitted between the light adjustment unit and the liquid crystal beam deflection unit.

The wavelength switching method 800 comprises: determining an incident sub-region and an exit sub-region for a switch-wavelength in the liquid crystal beam deflection unit (S810); determining a first phase-shift characteristic of the incidence sub-region and a second phase-shift characteristic of the exit sub-region (S820); and driving electrodes of the pixels in the incidence sub-region and the exit sub-region to generate the first phase-shift characteristic and the second phase-shift characteristic (S830).

In S810, the incident sub-region and the exit sub-region for the switch-wavelength to be switched may be determined in the liquid crystal beam deflection unit based on the incident light at which the switch-wavelength locates and the emergent light to which the switch-wavelength is switched, and information on the incident sub-region and the exit sub-region for the switch-wavelength to be switched may received from other apparatuses. As an example, a switch instruction may be received so as to determine the incident light at which the switch-wavelength locates and the emergent light to be switched, and the incident sub-region and the exit sub-region for the switch-wavelength may be determined in the liquid crystal beam deflection unit based on the incident light at which the switch-wavelength locates and the emergent light to be switched.

Figure 9:
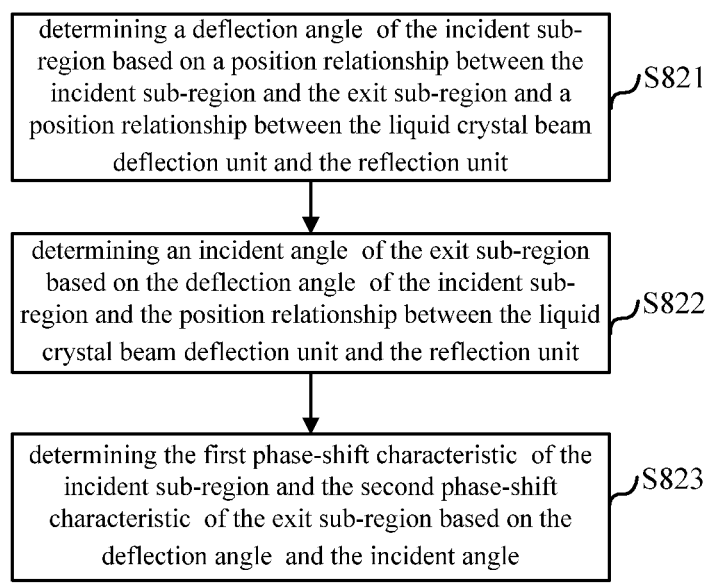
FIG. 9 is a flowchart exemplarily illustrating steps for determining phase-shift characteristics in the wavelength switching method according to the embodiments of the present disclosure.

FIG. 9 is a flowchart exemplarily illustrating steps for determining phase-shift characteristics S820 in the wavelength switching method according to the embodiments of the present disclosure. As illustrated in FIG. 9, in S820, the first phase-shift characteristic and the second phase-shift characteristic may be determined as follows: a deflection angle $\beta_1$ of the incident sub-region is determined based on a position relationship between the incident sub-region and the exit sub-region, and a position relationship between the liquid crystal beam deflection unit and the reflection unit (S821); an incident angle $\alpha_2$ of the exit sub-region is determined based on the deflection angle $\beta_1$ of the incident sub-region and the position relationship between the liquid crystal beam deflection unit and the reflection unit (S822); and the first phase-shift characteristic $M_1$ of the incident sub-region and the second phase-shift characteristic $M_2$ of the exit sub-region are determined based on the deflection angle $\beta_1$ and the incident angle $\alpha_2$.

In S821, the deflection angle $\beta_1$ of the incident sub-region may be determined according the above equation 1, that is, the he deflection angle $\beta_1$ of the incident sub-region may be determined according to the distance ($L_1$) between the liquid crystal beam deflection unit and the reflection unit, and the distance ($L_2$) between the incident sub-region and the exit sub-region in the second axis direction.

The incident angle $\alpha_2$ of the switch-wavelength in the exit sub-region is equal to the deflection angle $\beta_1$, because the liquid crystal beam deflection unit is parallel to the reflection unit. That is, the incident angle $\alpha_2$ in the exit sub-region is determined based on the deflection angle $\beta_1$ of the incident sub-region and the position relationship between the liquid crystal beam deflection unit and the reflection unit. As described above, smaller the deflection angle $\beta_1$ is, higher the corresponding deflection efficiency for lights is. Therefore the distances (for example, the above L2) among the respective incident sub-regions and the exit sub-regions in the liquid crystal beam deflection unit along the second axis direction, and the distance (for example, the above L1) between the liquid crystal beam deflection unit and the reflection unit may be designed depending on the deflection efficiency for lights of the liquid crystal beam deflection unit.

In S823, the first phase-shift characteristic $M_1$ and the second phase-shift characteristic $M_2$ according to the above Equations 2-3, and details are omitted herein. Therefore, the incident angle $\alpha_1$ and the deflection angle $\beta_1$ in the incident sub-region may be determined according to an optical path of the wavelength selective switch device, the first phase-shift characteristic $M_1$ in the incident sub-region may be determined by the Equation 2; and similarly the second phase-shift characteristic $M_2$ in the exit sub-region is determined by the Equation 3; so that an optical control for the switch-wavelength may be realized.

In practice, the above second light-converging unit may be utilized to enable the lights of the respective wavelengths in the incident lights to enter into the liquid crystal beam deflection unit perpendicularly to the second axis direction (the incident angle $\alpha_1$ is equal to 0), so that the calculation or determination operation in S820 may be simplified. Similarly, The respective sub-regions for the emergent lights in the liquid crystal beam deflection unit also may be driven such that the emergent lights of the respective wavelengths exit from the liquid crystal beam deflection unit perpendicularly to the second axis direction (the deflection angle $\beta_2$ in the exit sub-regions is equal to 0). Of course the incident angle $\alpha_1$ and the deflection angle $\beta_2$ may also be not zero, and as described above, the incident angle $\alpha_1$ may be preferably smaller than ±4° and the deflection angle $\beta_2$ also may be set otherwise according to requirements in the optical path.

In S820, the phase-shift characteristics in the respective sub-regions may be determined in other manners according to features of the liquid crystal beam deflection unit, and the manner for determining the phase-shift characteristics is only exemplary and does not limit the scope of the present disclosure.

In S830, a driving voltage for the incident sub-region and a driving voltage for the exit sub-region are generated based on the determined phase-shift characteristics, so that the electrodes of the pixels in the incident sub-regions and the exit sub-regions are driven to generate the first phase-shift characteristic and the second phase-shift characteristic.

According to a similar manner as stated above, a switch control for the lights of all wavelengths in all of the incident lights may be realized, so that the adding, dropping and direct-passing of the optical signals of the respective wavelengths may be realized.

In the above wavelength switching method for the wavelength selective switch device according to the embodiments of the present disclosure, the optical signals of the respective wavelengths from any one of the plurality of incident ports may be output from any one of the plurality of the exit ports by cooperating the liquid crystal beam deflection unit and the reflection unit and deflecting the lights in the sub-regions for the incident lights and the emergent lights, so that the number of the ports in the wavelength selective switch device is increased greatly and the bandwidths of the optical signals of the respective wavelengths may be adjusted flexibly.

Those skilled in the art may understand that the detailed implementation and structure of the wavelength selective switch device to which the wavelength switching method described above may be referred to the diagrams and operations in the embodiments of the wavelength selective switch device described in connection with FIGS. 1-7 previously, for the purpose of convenience and simplicity of the description, and their details are omitted herein.

In the embodiments provided in the application, it should be understand that the device and the method as disclosed can be implemented in other manners. For example, the embodiments of the device are only for illustration, and part of the steps in the above embodiments may be recombined.

The above descriptions only illustrate the specific embodiments of the present invention, and the protection scope of the present invention is not limited to this. Given the teaching as disclosed herein, variations or substitutions, which can easily occur to any skilled pertaining to the art, should be covered by the protection scope of the present invention. Thus, the protection scope of the present invention is defined by claims.

What is claimed is:

1. A wavelength selective switch device comprising:
an incidence unit including N incident lights, each incident light being a wavelength division multiplexed light composed of lights of a plurality of wavelengths, N being a natural number;
an exit unit including M emergent lights, each emergent light comprising one or more lights of wavelengths selected from the respective incident lights, M being a natural number;
a wavelength diversifying-synthesizing unit for diversifying the respective incident lights in the incidence unit in a first axis direction according to the wavelengths, and multiplexing reflecting lights directed toward the exit unit and diversified in the first axis direction according to the wavelengths;

a light adjustment unit, disposed correspondingly to the respective incident lights and the respective emergent lights in a second axis direction different from the first axis direction, for making the respective incident lights and the respective reflecting lights, which are diversified in the first axis direction, be not diversified in the second axis direction;

a liquid crystal beam deflection unit having a plurality of pixels arranged in a same plane and divided into sub-regions corresponding to the respective wavelengths in the incident lights and the emergent lights, respectively, for deflecting the lights of the respective wavelengths received from the light adjustment unit or the reflecting lights of the respective wavelengths by changing phase-shift characteristics of the pixels in the sub-regions;

a reflection unit, disposed in parallel with the liquid crystal beam deflection unit, for reflecting the lights of the respective wavelengths deflected in the corresponding sub-regions for the incident lights to the corresponding sub-regions for the emergent lights so as to be deflected; and a processor configured to run computer program instruction to perform:
determining an incident sub-region and an exit sub-region for a switch-wavelength to be switched in the liquid crystal beam deflection unit,
determining a first phase-shift characteristic of the incidence sub-region and a second phase-shift characteristic of the exit sub-region, and
driving electrodes of the pixels in the incidence sub-region and the exit sub-region to generate the first phase-shift characteristic and the second phase-shift characteristic.

2. The wavelength selective switch device of claim 1, wherein the light adjustment unit is a cylindrical lens array comprising a plurality cylindrical lenses arranged in the second axis direction, and the respective cylindrical lenses arranged in the second axis direction correspond to the respective incident lights and the respective emergent lights in the second axis direction.

3. The wavelength selective switch device of claim 1, wherein the liquid crystal beam deflection unit is a component manufactured based on the Liquid Crystal On Silicon, and the wavelength selective switch device further comprises:
a polarization conversion unit, disposed between the incidence unit and the wavelength diversifying-synthesizing unit, for converting the respective incident lights in the incidence unit into the lights of the polarization state deflectable by the liquid crystal beam deflection unit, and for converting the respective reflecting lights having a single polarization state from the wavelength diversifying-synthesizing unit into the reflecting lights having two polarization components which are perpendicular to each other.

4. The wavelength selective switch device of claim 1, wherein the wavelength diversifying-synthesizing unit is one of diffraction grating of transmittance type or a diffraction grating of reflection type.

5. The wavelength selective switch device of claim 1, further comprises:
a light-converging unit, disposed between the liquid crystal beam deflection unit and the reflection unit, for converging, in the first axis direction, the lights of the respective wavelengths transmitted between the liquid crystal beam deflection unit and the reflection unit.

6. The wavelength selective switch device of claim 1, further comprises:
a beam expanding unit, disposed between the incidence unit and the wavelength diversifying-synthesizing unit, for beam expanding the respective incident lights in the incidence unit, in order to increase light spots formed by the respective incident lights in the first axis direction as the respective incident lights enter into the wavelength diversifying-synthesizing unit.

7. The wavelength selective switch device of claim 1, wherein the plurality of the pixels in the liquid crystal beam deflection unit are divided, in the second axis direction, into mass-regions corresponding to the respective incident lights and the respective emergent lights one to one, respectively, and each of the mass-regions is divided into the respective sub-regions corresponding to the wavelengths in the first axis direction.

8. The wavelength selective switch device of claim 7, wherein distances between the respective mass-regions in the liquid crystal beam deflection unit and a distance between the liquid crystal beam deflection unit and the reflection unit are designed based on a deflection efficiency for lights of the liquid crystal beam deflection unit.

9. The wavelength selective switch device of claim 1, wherein the processor further performs:
determining the incident sub-region and the exit sub-region for the switch-wavelength to be switched in the liquid crystal beam deflection unit based on the incident light at which the switch-wavelength locates and the emergent light to which the switch-wavelength is switched;
determining a deflection angle $\beta_1$ of the incident sub-region and an incident angle $\alpha_2$ of the exit sub-region based on a position relationship between the incident sub-region and the exit sub-region, and a position relationship between the liquid crystal beam deflection unit and the reflection unit, and for determining the first phase-shift characteristic $M_1$ of the incident sub-region and the second phase-shift characteristic $M_2$ of the exit sub-region based on the deflection angle $\beta_1$ and the incident angle $\alpha_2$ ; and
applying a first voltage to the pixels in the incident sub-region according to the first phase-shift characteristic $M_1$ and applying a second voltage to the pixels in the exit sub-region according to the second phase-shift characteristic $M_2$ , in order to drive the switch-wavelength to be deflected.

10. The wavelength selective switch device of claim 9, wherein the processor further determines the deflection angle $\beta_1$ of the incident sub-region according to an equation as follows:

$$\beta_1 = \arctan\frac{L_2}{2L_1}$$

wherein $L_1$ is a distance between the liquid crystal beam deflection unit and the reflection unit, and $L_2$ is a distance between the incident sub-region and the exit sub-region in the second axis direction.

11. The wavelength selective switch device of claim 9, wherein the processor further determines the first phase-shift characteristic $M_1$ and the second phase-shift characteristic $M_2$ according to Equations as follows:

$$n\lambda = M_1 d(\sin\alpha_1 + \sin\beta_1)$$

$$n\lambda = M_2 d(\sin\alpha_2 + \sin\beta_2)$$

wherein n is a diffraction order in a case that the liquid crystal beam deflection unit is equivalent to a diffraction grating, $\alpha_1$ is an incident angle of the switch-wavelength in the incident sub-region, $\beta_1$ is a deflection angle of the switch-wavelength in the incident sub-region, $\beta_2$ is a deflection angle of the switch-wavelength in the exit sub-region, $\lambda$ is the switch-wavelength and d is a size of the pixel in the liquid crystal beam deflection unit.

12. The wavelength selective switch device of claim 1, further comprising:

a second light-converging unit, disposed between the light adjustment unit and the liquid crystal beam deflection unit, for converging, in the first axis direction, the lights of the respective wavelengths transmitted between the light adjustment unit and the liquid crystal beam deflection unit.

13. The wavelength selective switch device of claim 12, wherein the second light-converging unit is configured to enable the lights of the respective wavelengths in the incident lights to incident to the liquid crystal beam deflection unit perpendicularly to the second axis direction, and the respective sub-regions for the emergent lights in the liquid crystal beam deflection unit are driven such that the emergent lights of the respective wavelengths exit from the liquid crystal beam deflection unit perpendicularly to the second axis direction.

14. A communication apparatus, comprising the wavelength selective switch device of claim 1.

15. A wavelength switching method for a wavelength selective switch device, the wavelength selective switch device comprising an incidence unit including N incident lights, each incident light being a wavelength division multiplexed light composed of lights of a plurality of wavelengths, N being a natural number; an exit unit including M emergent lights, each emergent light comprising one or more lights of wavelengths selected from the respective incident lights, M being a natural number; a wavelength diversifying-synthesizing unit for diversifying the respective incident lights in the incidence unit in a first axis direction according to the wavelengths, and multiplexing reflecting lights directed toward the exit unit and diversified in the first axis direction according to the wavelengths; a light adjustment unit, disposed correspondingly to the respective incident lights and the respective emergent lights in a second axis direction different from the first axis direction, for making the respective incident lights and the respective reflecting lights, which are diversified in the first axis direction, be not diversified in the second axis direction; a liquid crystal beam deflection unit having a plurality of pixels arranged in a same plane and divided into regions corresponding to the incident lights and the emergent lights, respectively, in the second axis direction, and each region is divided into a plurality of sub-regions corresponding to the wavelengths in the first axis direction, for deflecting the lights of the respective wavelengths or the reflecting lights of the respective wavelengths received from the light adjustment unit by changing phase-shift characteristics of the pixels in the sub-regions; a reflection unit, disposed in parallel with the liquid crystal beam deflection unit, for reflecting the lights of the respective wavelengths deflected in the corresponding sub-regions for the incident lights to the corresponding sub-regions for the emergent lights so as to be deflected, the wavelength switching method comprising:

determining an incident sub-region and an exit sub-region for a switch-wavelength in the liquid crystal beam deflection unit;

determining a first phase-shift characteristic of the incidence sub-region and a second phase-shift characteristic of the exit sub-region, and driving electrodes of the pixels in the incidence sub-region and the exit sub-region to generate the first phase-shift characteristic and the second phase-shift characteristic.

16. The wavelength switching method of claim 15, wherein determining the phase-shift characteristic of the incident sub-region and the phase-shift characteristic of the exit sub-region comprises:

determining a deflection angle $\beta_1$ of the incident sub-region based on a position relationship between the incident sub-region and the exit sub-region, and a position relationship between the liquid crystal beam deflection unit and the reflection unit;

determining an incident angle $\alpha_2$ of the exit sub-region based on the deflection angle $\beta_1$ of the incident sub-region and the position relationship between the liquid crystal beam deflection unit and the reflection unit; and determining the first phase-shift characteristic $M_1$ of the incident sub-region and the second phase-shift characteristic $M_2$ of the exit sub-region are determined based on the deflection angle $\beta_1$ and the incident angle $\alpha_2$.

17. The wavelength switching method of claim 16, wherein the deflection angle $\beta_1$ of the incident sub-region is determined according to an equation as follows:

$$\beta_1 = \arctan\frac{L_2}{2L_1}$$

wherein $L_1$ is a distance between the liquid crystal beam deflection unit and the reflection unit, and $L_2$ is a distance between the incident sub-region and the exit sub-region in the second axis direction.

18. The wavelength switching method of claim 16, further comprising a phase-shift calculation unit determining the first phase-shift characteristic $M_1$ and the second phase-shift characteristic $M_2$ according to Equations as follows, respectively:

$$n\lambda = M_1 d(\sin\alpha_1 + \sin\beta_1)$$

$$n\lambda = M_2 d(\sin\alpha_2 + \sin\beta_2)$$

wherein n is a diffraction order in a case that the liquid crystal beam deflection unit is equivalent to a diffraction grating, $\alpha_1$ is an incident angle of the switch-wavelength in the incident sub-region, $\beta_1$ is a deflection angle of the switch-wavelength in the incident sub-region, $\beta_2$ is a deflection angle of the switch-wavelength in the exit sub-region, $\lambda$ is the switch-wavelength and d is a size of the pixel in the liquid crystal beam deflection unit.

19. The wavelength switching method of claim 15, wherein the wavelength selective switch device further comprises: a second light-converging unit, disposed between the light adjustment unit and the liquid crystal beam deflection unit, or converging, in the first axis direction, the lights of the respective wavelengths transmitted between the light adjustment unit and the liquid crystal beam deflection unit, the second light-converging unit being configured to enable the lights of the respective wavelengths in the incident lights to incident to the liquid crystal beam deflection unit perpendicularly to the second axis direction, and the respective sub-regions for the emergent lights in the liquid crystal beam deflection unit are driven such that the emergent lights of the respective wavelengths exit from the liquid crystal beam deflection unit perpendicularly to the second axis direction.

\* \* \* \* \*